(12) United States Patent
Watanabe et al.

(10) Patent No.: US 6,810,014 B1
(45) Date of Patent: Oct. 26, 2004

(54) ATM MULTIPLEX APPARATUS AND CONGESTION REPORTING METHOD

(75) Inventors: Toru Watanabe, Fukushima-ken (JP); Kimitoshi Takeuchi, Fukushima-ken (JP); Kanichi Satou, Fukushima-ken (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 09/523,758

(22) Filed: Mar. 13, 2000

(30) Foreign Application Priority Data

Mar. 12, 1999 (JP) ........................................... 11-066439

(51) Int. Cl.[7] .............................................. H04L 12/26
(52) U.S. Cl. .................................... 370/232; 370/395.1
(58) Field of Search ................................. 370/230, 232, 370/233, 235, 235.1, 236, 395.1, 229, 230.1, 234

(56) References Cited

U.S. PATENT DOCUMENTS

| | | | |
|---|---|---|---|
| 5,506,839 A | | 4/1996 | Hatta |
| 5,675,574 A | * | 10/1997 | Norizuki et al. ............ 370/230 |
| 5,704,047 A | * | 12/1997 | Schneeberger .............. 709/235 |
| 5,737,314 A | * | 4/1998 | Hatono et al. .............. 370/235 |
| 5,898,670 A | * | 4/1999 | Hoebeke et al. ............ 370/468 |
| 5,903,547 A | * | 5/1999 | Shimokasa .................. 370/232 |
| 6,385,171 B1 | * | 5/2002 | Takase et al. ............... 370/235 |

FOREIGN PATENT DOCUMENTS

| | | |
|---|---|---|
| JP | 7015436 | 1/1995 |
| JP | 7147592 | 6/1995 |
| JP | 9083566 | 3/1997 |
| JP | 9284388 | 10/1999 |

\* cited by examiner

*Primary Examiner*—Hassan Kizou
*Assistant Examiner*—Dmitry Levitan
(74) *Attorney, Agent, or Firm*—Antonelli, Terry, Stout & Kraus, LLP

(57) ABSTRACT

A congestion control method and apparatus that conducts congestion control for a frame relay terminal in real time and without any time lag when a congestion has occurred at an outgoing cell store medium of a fast multiplex unit of an ATM multiplex apparatus. The fast multiplex unit of the ATM multiplex apparatus is provided with a outgoing cell store medium monitor unit monitoring a congestion level of the outgoing cell store medium and generating a congestion reporting signal indicative of the congestion level and a light/heavy congestion indication signal. The time lag which occurs when the congestion reporting is made is eliminated by sending both signals directly to a frame relay interface control unit from the fast multiplex unit.

3 Claims, 4 Drawing Sheets

ATM MULTIPLEX APPARATUS AND CONGESTION REPORTING METHOD

BACKGROUND OF THE INVENTION

1. Field of the Invention

This invention relates to an ATM multiplex apparatus transmitting audio and various types of data by using an ATM technology, and a congestion reporting method used in the apparatus.

2. Description of Related Art

An ATM multiplex apparatus of prior art is disposed between an ATM network and various types of terminals such as frame relay (FR) terminals and data terminals, and comprises an interface unit interfacing with the terminals, a multiplex unit multiplexing data to be sent from the terminals, a main control unit controlling actions of the interface unit and the multiplex unit.

In the ATM multiplex apparatus of prior art, a congestion level of data storing medium in the multiplex unit is monitored by the main control unit, and various congestion control processing is executed in accordance with a monitoring result.

For example, when the frame relay terminal is connected to the ATM multiplex apparatus, the congestion control is performed by having the main control unit obtains information regarding a detection of the congestion at the multiplex unit, and then the main control unit reports the congestion at the multiplex unit to an interface unit of the frame relay terminal.

Prior art of the congestion control technology is disclosed in, for example, Japanese Patent Application Laid-Open 07-015436, 07-147592, 09-083566, and 9-284338.

SUMMARY OF THE INVENTION

The congestion reporting method used in the congestion control technology of prior art is realized by a software processing to transmit the congestion control report to the interface unit of the frame relay terminal via the main control unit. Accordingly, a real time congestion control is not possible due to a time lag between the detection of the congestion and the reporting to the interface control unit.

An object of the present invention is to provide a congestion reporting method enabling a faster congestion control of a frame relay terminal, and an ATM multiplex apparatus such a congestion reporting method.

The object of the present invention is accomplished by providing units for transmitting and receiving exclusive signals to report a congestion in between a multiplex unit and a frame relay interface control unit in an ATM multiplex apparatus. Accordingly, a congestion control may be executed in real time since it becomes possible to report a congestion level of a data storage medium of the multiplex unit directly to the frame relay interface control unit using the exclusive congestion reporting signals.

The object of the present invention is also accomplished by providing an ATM multiplex apparatus connected to information terminals for multiplexing information to be communicated and transmitting the multiplexed information via an ATM network, comprising an interface unit interfacing with the information terminals, a multiplex unit multiplexing information from the information terminals, a congestion level detect unit detecting a congestion level of the multiplex unit, and a congestion signal report unit generating signals indicative of a congestion level detected by the congestion level detect unit and outputting the signals to the interface unit, wherein the interface unit accepts the signals indicative of the congestion level, and executes a congestion control for the information terminal in accordance with the congestion level indicated by the signals.

The object of the present invention is also accomplished by providing a congestion reporting method for an ATM multiplex apparatus multiplexing and transmitting information, including the steps of generating signals indicative of a congestion level of a data storage medium of a multiplex unit disposed in the ATM multiplex unit for executing a congestion control of a frame relay interface, and outputting the generated signals in real time to an interface unit interfacing with a frame relay terminal.

DESCRIPTION OF THE PREFERRED EMBODIMENTS

An embodiment of an ATM multiplex apparatus in accordance with the present invention will now be described with reference to figures.

Figure 1:
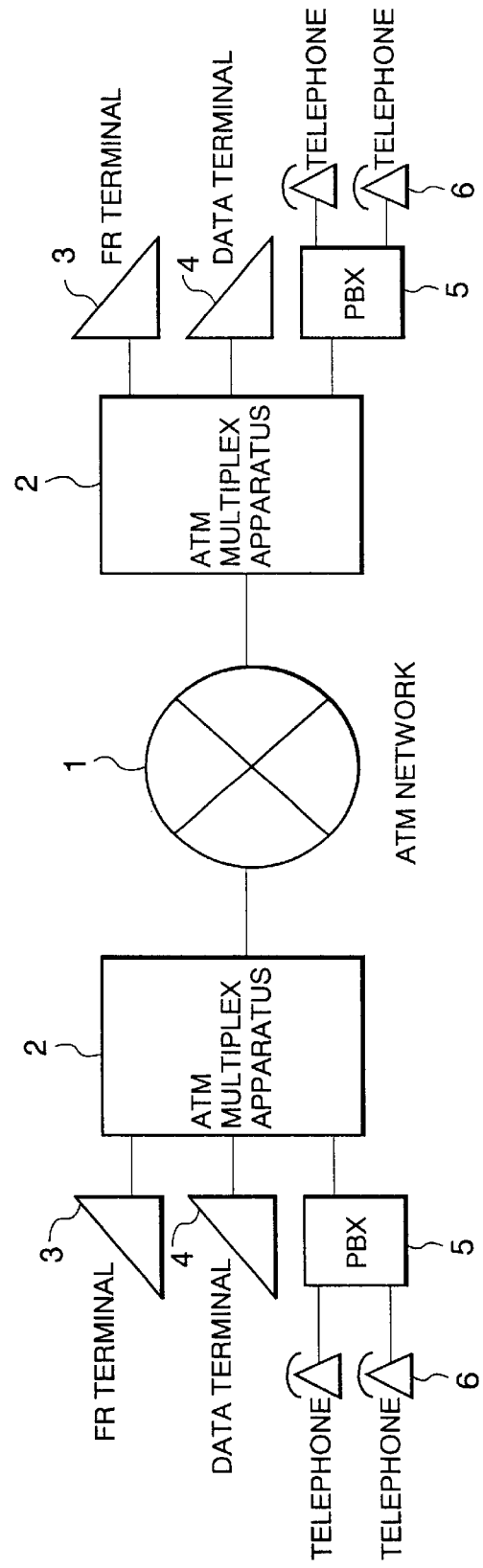
FIG. 1 is a schematic illustration showing an interrelationship of the ATM communication network using an ATM multiplex apparatus.

As shown in FIG. 1, an ATM multiplex apparatus 2 in the present embodiment is connected to various information apparatus such as a frame relay (FR) terminal 3, a data terminal 4 and a PBX 5 connecting to telephones 6, and creates cell from each information unit and multiplexes the cell so as to realize the inter-communication via an ATM network 1.

Figure 2:
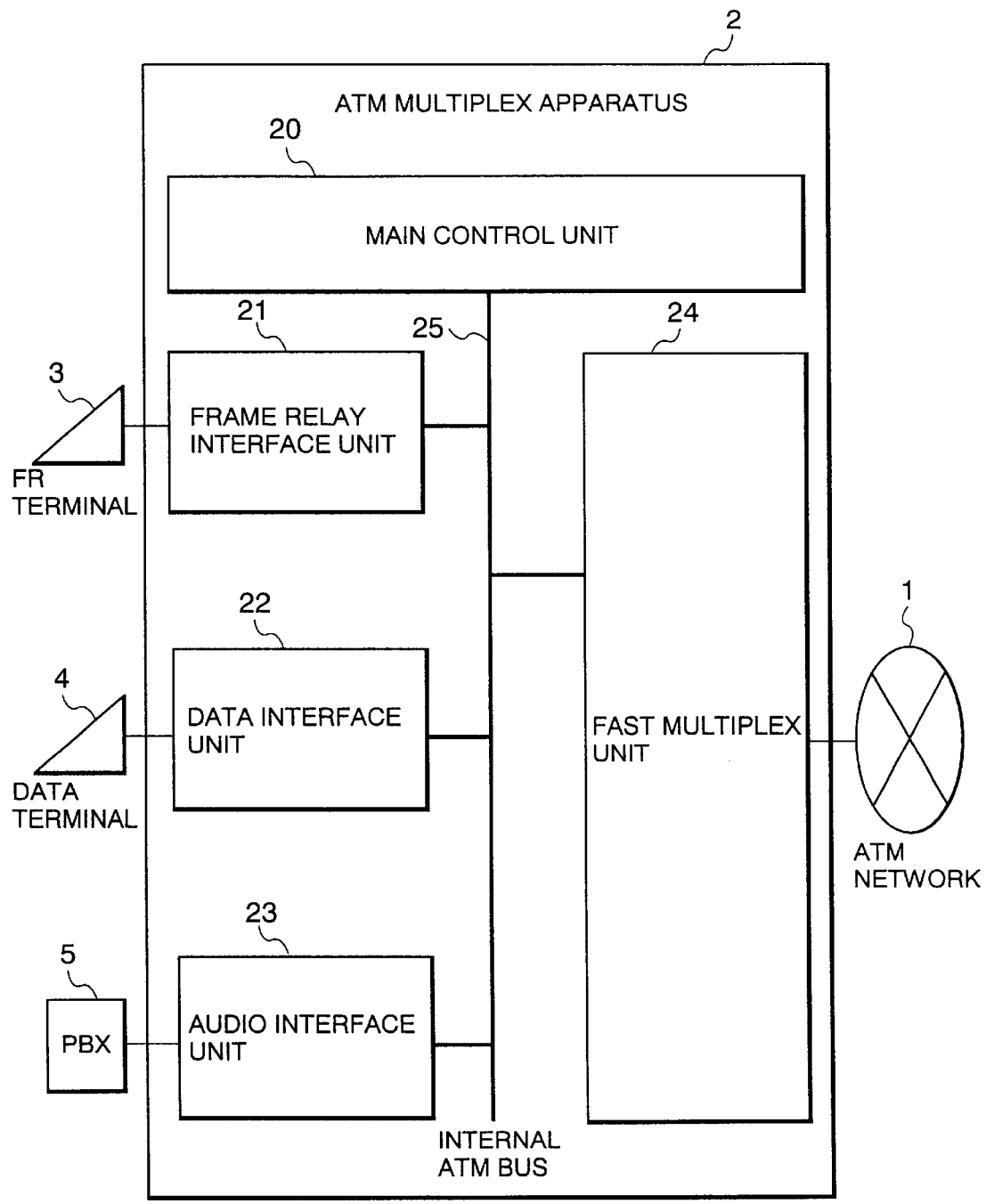
FIG. 2 is a schematic illustration showing an example of an internal construction of the ATM multiplex apparatus.

FIG. 2 shows an example of an internal construction of the ATM multiplex apparatus 2 in the present embodiment.

The ATM multiplex apparatus 2 comprises a main control unit 20 monitoring and controlling the whole ATM multiplex apparatus 2, a frame relay interface unit 21 having an interface circuit for the frame relay terminal 3 and exchanging frames and cells, a data interface unit 22 having an interface circuit for the data terminal 4 and exchanging various types of data and cells, an audio interface unit 23 having an interface circuit for the PBX 5 and exchanging audio information and cells, a fast multiplex unit 24 multiplexing the cells from these interface units and connecting to the ATM network 1, and an internal ATM bus 25 transmitting and receiving the cells between the main control unit 20, the interface units 21, 22, 23, and the fast multiplex unit 24.

Figure 3:
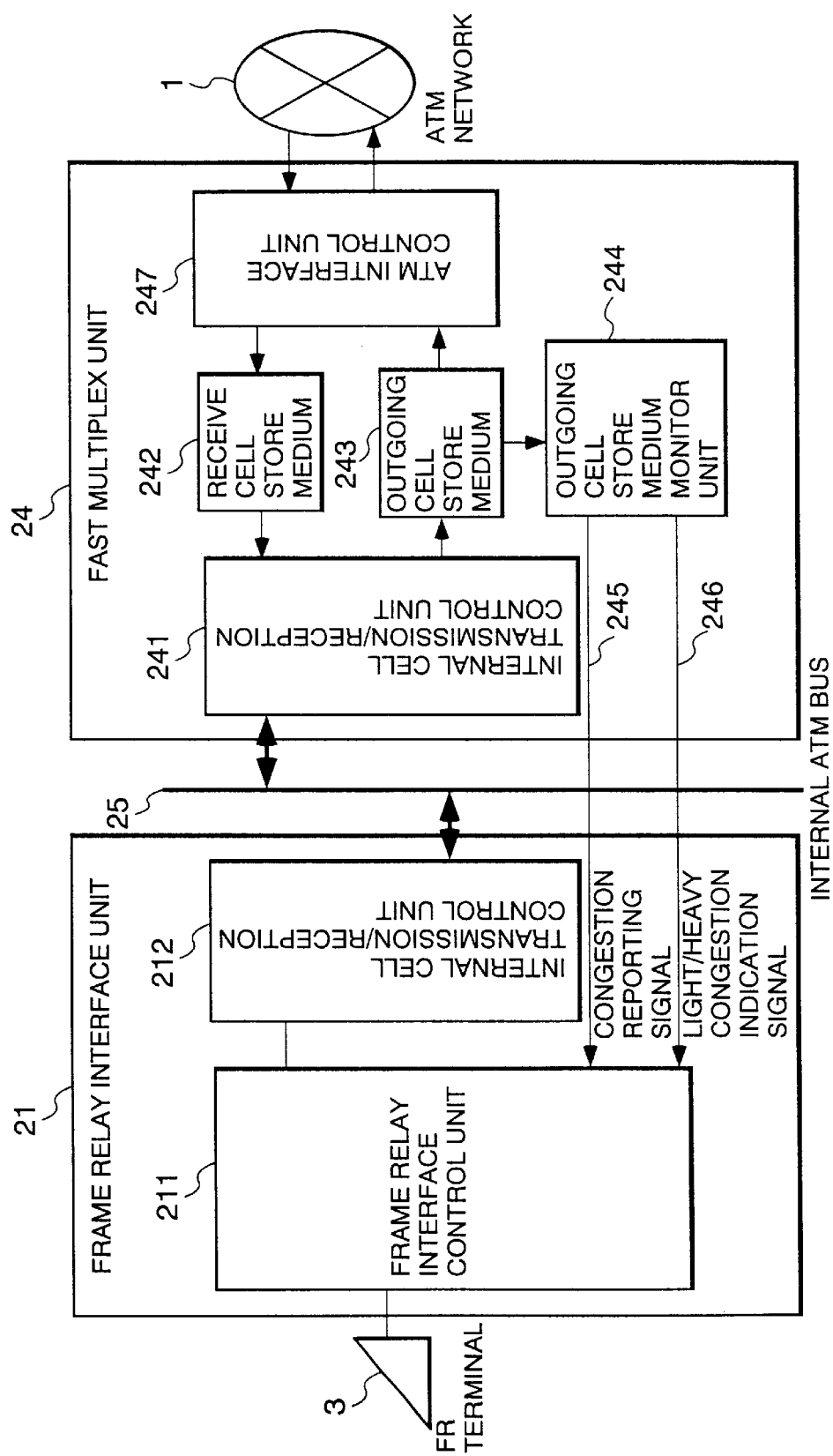
FIG. 3 is a schematic illustration showing a functional construction between a fast multiplex unit and a frame relay interface unit of the ATM multiplex apparatus.

Next, an example of constructions in the frame relay interface unit 21 and the fast multiplex unit 24 will now be described with reference to FIG. 3. The frame relay interface unit 21 and the fast multiplex unit 22 are characteristic parts of the present invention among the ATM multiplex apparatus 2 described above.

The example is constructed so that the congestion report can be executed involving the minimum software processing by providing an exclusive signal for reporting the congestion between the frame relay interface unit 21 and the fast multiplex unit 24.

The frame relay interface unit 21 comprises a frame relay interface control unit 211 performing an interface control with the frame relay terminal 3, and an internal cell transmission/reception control unit 212 exchanging the frames and the cells and performing a transmission/reception control with the internal ATM bus 25. The frame relay interface unit 21 accepts a congestion reporting signal and an indication signal indicating a congestion level, and executes the congestion control with predetermined steps. The congestion reporting signal and the congestion level indication signal will be explained in the following.

The fast multiplex unit 24 comprises the internal cell transmission/reception control unit 241 controlling the transmission and reception actions with the internal ATM bus 25, an ATM interface control unit 247 performing the interface control with the ATM network 1, a receive cell store medium 242 storing the cells received from the ATM interface control unit 247, an outgoing cell store medium 243 storing the cells received from the interface units 21, 22, 23 shown in FIG. 1 via the internal ATM bus 25 so as to transmit the received cells to the ATM network 1 via the ATM interface control unit 247, and an outgoing cell store medium monitor unit 244 detecting a congestion level of the outgoing cell store medium 243, creating a signal for reporting the detected congestion level and transmitting the created signal.

In this example, the outgoing cell store medium monitor unit 244 is connected to the outgoing cell store medium 243, and outputs a congestion reporting signal 245 reporting the congestion level in the outgoing cell store medium 243 and a light/heavy congestion indication signal 246 reporting the level of the congestion being light or heavy to the frame relay interface control unit 211.

Figure 4:
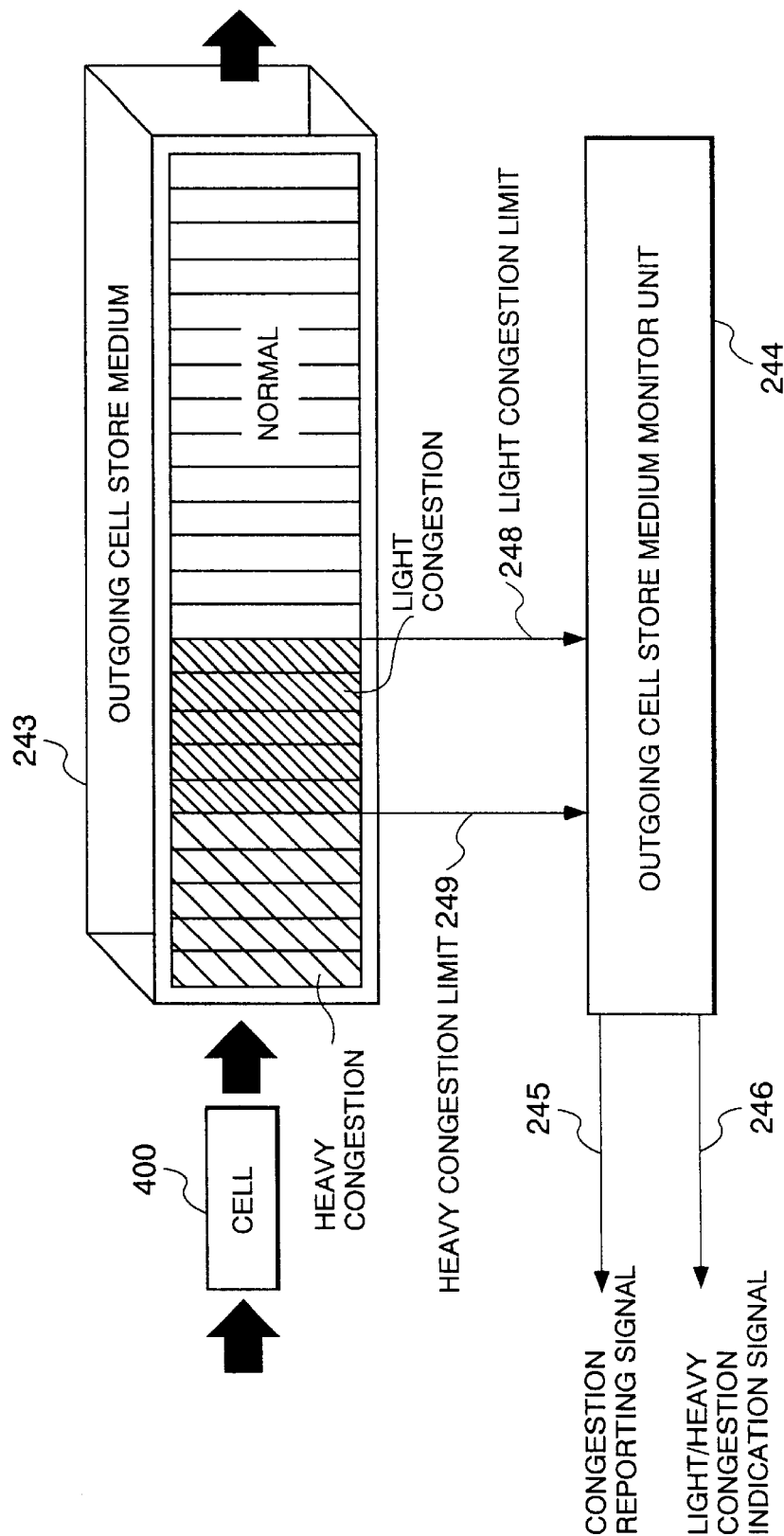
FIG. 4 is a schematic illustration showing a congestion monitoring method of outgoing cell store medium of a fast multiplex unit of the ATM multiplex apparatus.

Congestion detection and reporting method and a control method of the congestion reported by such a method in the present embodiment will now be described with reference to FIG. 4.

A light congestion limit 248 and a heavy congestion limit 249 are set in advance for the outgoing cell store medium 243. The outgoing cell store medium monitor unit 244 monitors a congestion level using these predetermined light congestion limit 248 and heavy congestion limit 249 as reference points.

The cell 400 received from the interface units 21, 22, 23 shown in FIG. 1 via the internal ATM bus 25 is stored in the outgoing cell store medium 243; and transmitted to the ATM network 1 via the ATM interface control unit 247.

The outgoing cell store medium monitor unit 244 outputs the congestion reporting signal 245 when traffic in the internal ATM bus 25 becomes heavier and amount of the cells stored in the outgoing cell store medium 243 exceeds the light congestion limit 248. The light/heavy congestion indication signal 246 indicates the light congestion at this moment.

In the frame relay interface unit 21, the frame relay interface control unit 211 executes a light congestion control processing in real time by detecting the congestion reporting signal 245, making an judgment of the light congestion in accordance with the light/heavy indication signal 246, and transmitting a signal indicative of an occurrence of the congestion to the frame relay terminal 3.

When the traffic in the internal ATM bus becomes further heavier and the amount of the cells stored in the outgoing cell store medium 243 exceeds the heavy congestion limit 249, the light/heavy congestion indication signal 246 transmitted from the outgoing cell store medium monitor unit 244 indicates the heavy congestion. The frame relay interface control unit 211 makes an judgment of the heavy congestion in accordance with the light/heavy congestion indication signal 246, and executes a heavy congestion control processing in real time for the frame relay terminal 3.

Furthermore, the outgoing cell store medium monitor unit 244 stops the transmission of the congestion reporting signal 245 when the traffic in the internal ATM bus 25 is decreased by the congestion control processing and the amount of the cells stored in the outgoing cell store medium 243 comes back to a normal range. The frame relay interface control unit 211 makes an judgement of that the congestion is relieved by detecting no congestion reporting signal 245, and stops the congestion control for the frame relay terminal 3.

The present invention enables the execution of the congestion control for the frame relay terminal without involving the main control unit of the ATM multiplex apparatus by detecting the congestion level in the multiplex unit of the ATM multiplex apparatus. Furthermore, the present invention enables the quicker congestion control in real time by eliminating the time lag between the occurrence of the congestion and the start of the congestion control.

What is claimed is:

1. An ATM multiplex apparatus connected to information terminals for multiplexing information to be communicated and transmitting the multiplexed information via an ATM network, comprising:
   an interface unit interfacing with said information terminals;
   a multiplex unit multiplexing information from said information terminals to transmit to said ATM network; and
   a main control unit controlling said interface unit and said multiplex unit,
   wherein said multiplex unit comprises:
   a congestion level detect unit detecting a congestion level of information to be transmitted to said ATM network, and
   a congestion signal report unit generating signals indicative of a congestion level detected by said congestion level detect unit and outputting said signals directly to said interface unit without routing through said main control unit,
   wherein said interface unit accepts said signals indicative of the congestion level directly from said congestion signal report unit, and executes a congestion control for said information terminals in accordance with the congestion level indicated by said signals, thereby eliminating time lags between an occurrence of congestion and start of congestion control.

2. An ATM multiplex apparatus in accordance with claim 1,
   wherein said information terminals are a plurality of information terminals including at least one frame relay terminal,
   wherein said interface unit comprises a plurality of interface units provided in correspond with each of said plurality of information terminals including at least one frame relay interface unit interfacing said frame relay terminal,
   wherein said congestion level detect unit detects a congestion level of said information by detecting a congestion level of a data storage medium included in said multiplex unit, and
   wherein said congestion signal report unit outputs said signals indicative of the congestion level directly to said frame relay interface unit without routing through said main control unit.

3. A congestion reporting method for an ATM multiplex apparatus which multiplexes and transmits information from information terminals, wherein said ATM multiplex apparatus comprises:

an interface unit interfacing with said information terminals, a multiplex unit multiplexing the information from said information terminals to transmit the multiplexed information to an ATM network, and a main control unit controlling said interface unit and said multiplex unit; and wherein said congestion reporting method comprises the steps of: generating signals indicative of a congestion level of said information by an amount of the data stored in a data storage medium of said multiplex unit, outputting said signals thus generated in real time to said interface unit without routing through said main control unit, and executing a congestion control for said information terminals in accordance with the congestion level indicated by said signals, wherein said interface unit directly receives said signals, from said multiplex unit thereby eliminating time lags between an occurrence of congestion and start of congestion control.

* * * * *